June 28, 1949.  W. H. McKISSICK  2,474,433
SNATCH BLOCK

Filed April 12, 1948  2 Sheets-Sheet 1

INVENTOR.
W. H. McKISSICK
BY
C. M. McKnight

June 28, 1949.  W. H. McKISSICK  2,474,433
SNATCH BLOCK
Filed April 12, 1948  2 Sheets-Sheet 2
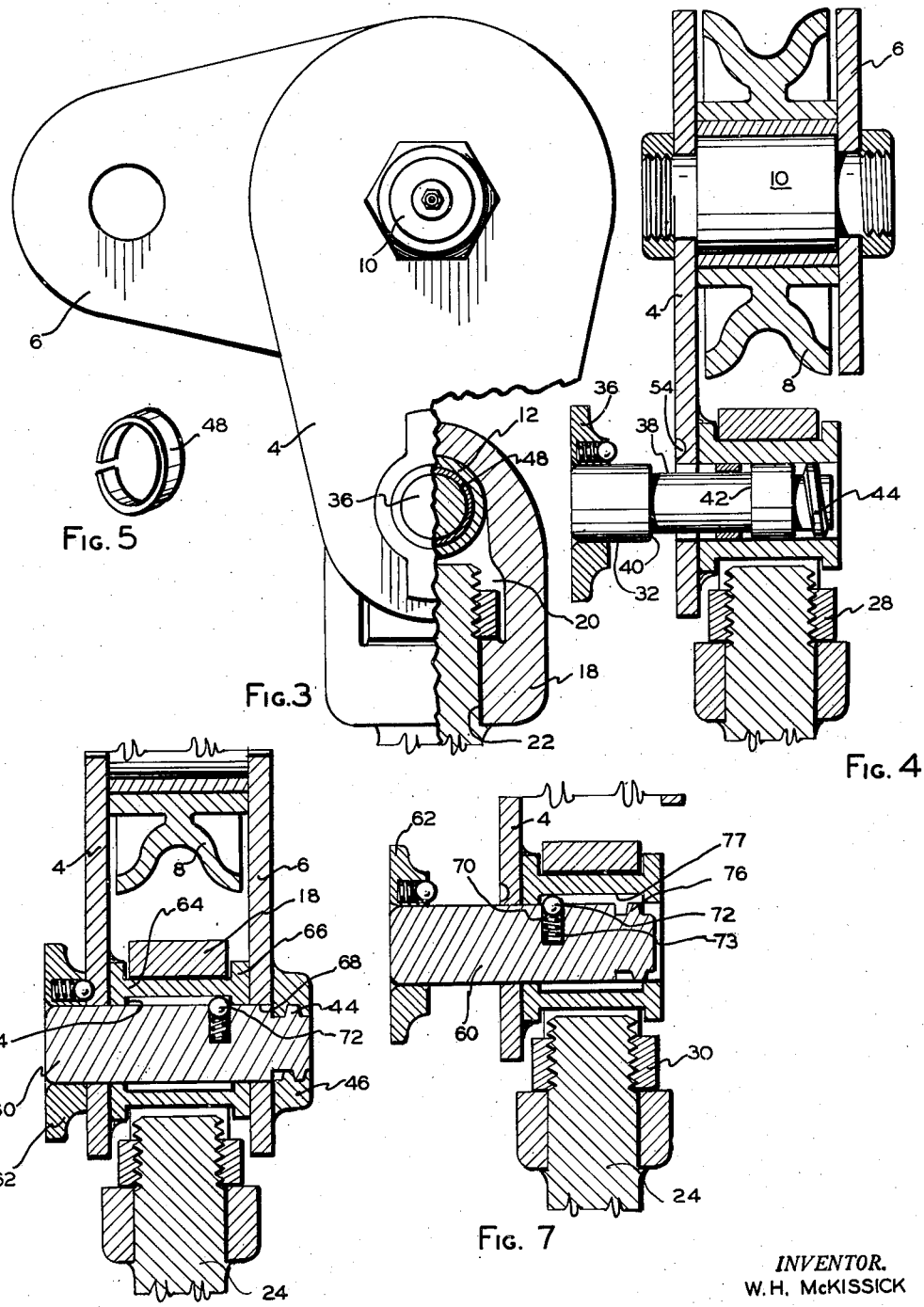
INVENTOR.
W. H. McKISSICK
BY Patented June 28, 1949

UNITED STATES PATENT OFFICE 2,474,433

SNATCH BLOCK

William H. McKissick, Tulsa, Okla.

Application April 12, 1948, Serial No. 20,487

6 Claims. (Cl. 254—193)

This invention relates to improvements in snatch blocks, and more particularly to an improvement in snatch blocks disclosed in United States Patent No. 2,366,636, issued to W. H. McKissick et al. on January 2, 1945.

In threading cable on the sheave of present day snatch blocks it is usually necessary to loosen one of the side plates in the block through a connecting bolt member to allow rotation of the plate for the threading procedure. The connecting bolt is usually lost or misplaced and consequently, in a field operation, cannot be readily replaced.

It is an important object of this invention to provide a snatch block having a bolt member securing the spaced side plates thereof wherein the bolt member upon release will permit rotation of one of the side plates to permit threading of the cable on the pulley.

And still another object of this invention is to provide a snatch block having a side plate releasing member to permit threading of the pulley wherein the releasing member is maintained in the block during the threading operation.

And still another object of this invention is to provide a snatch block wherein the bolt permitting releasing of the plates for threading the pulley is movable in the block, yet maintained thereon during the threading operation.

Other objects and advantages of the invention will be evident from the following detailed description, read in conjunction with the accompanying drawings, which illustrate my invention.

In the drawings:

Figure 3 is a fragmentary elevational view with certain parts in section showing one side plate of the block displaced relative to the other for facilitating stringing of the cable.

Figure 4 is a vertical sectional view of the structure shown in Figure 3.

Figure 5 is a detailed view of the locking means for the releasing bolt.

Figure 6 is a fragmentary sectional view of a modified form of locking means in one position.

Figure 7 is a similar view showing the securing bolt in releasing position.

Figures 1, 2:
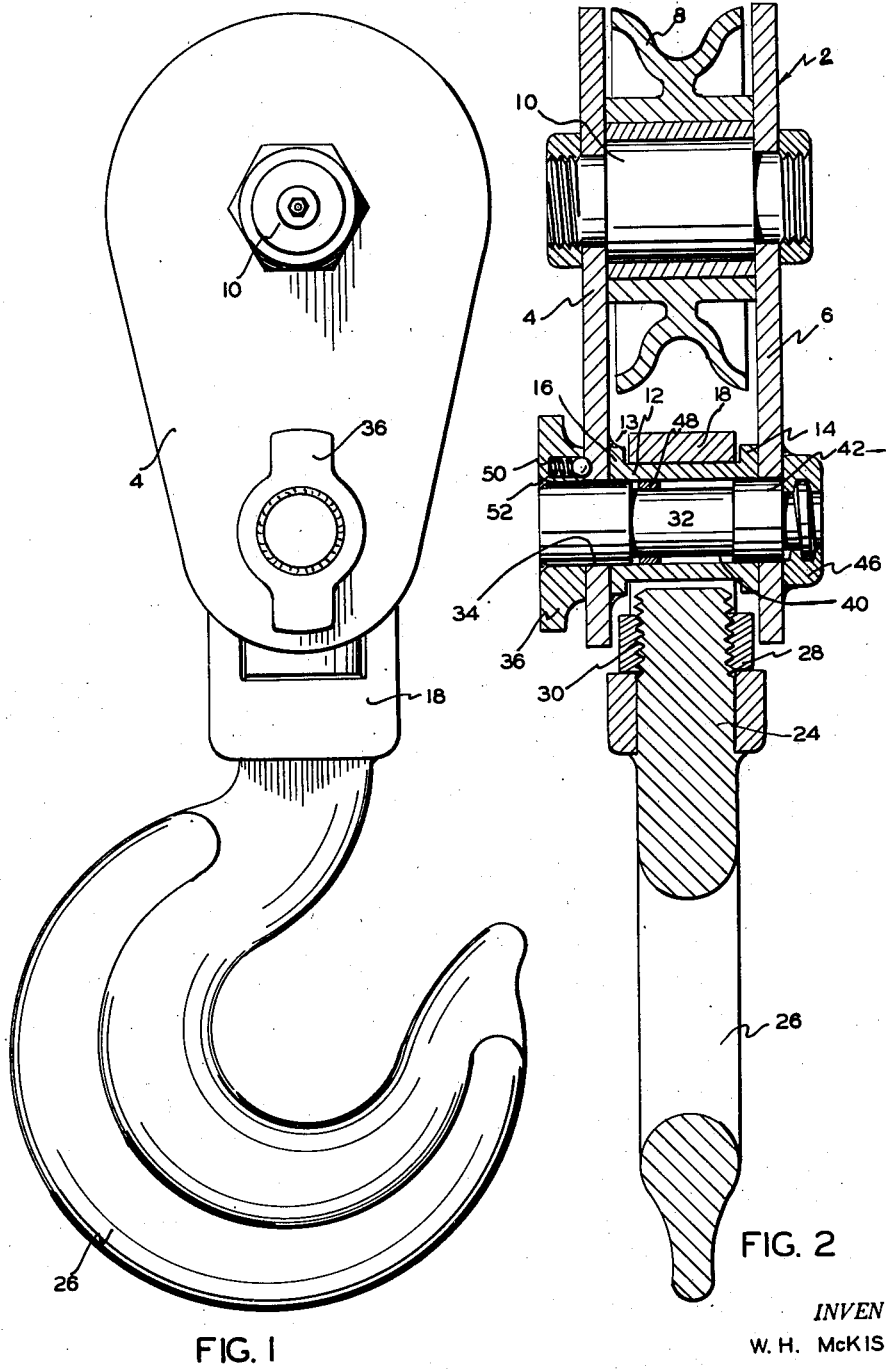
Figure 1 is a side elevational view of the snatch block.
Figure 2 is a transverse vertical sectional elevational view of the structure shown in Figure 1.

Referring to the drawings and particularly Figures 1 to 5 inclusive reference character 2 designates a snatch block generally having side plates 4 and 6 respectively. Any suitable type sheave member 8 is journaled through a bearing shaft 10 between the side plates 4 and 6 as clearly shown in Figures 2 and 4. A tubular member 12 is positioned horizontally between the side plates and maintained therebetween by welding or the like to the plate 4 as at 13. The tube 12 is provided with end flanges 14 and 16 for a purpose as will be hereinafter set forth.

A becket member 18 preferably of stirrup shape (Fig. 3) has an open window 20 of a size to pass over the end flanges 14 for disposing the becket on to, or removing it from the tube 12. The lower end of the becket 18 is provided with an aperature 22 for receiving a rotatable shank 24 integral with a hook 26 depending from the becket in the usual manner. The shank 24 may be secured to the becket by any suitable means such as a nut 28 threaded to an upper threaded portion 30 of the shank 24.

A bolt 32 extends through aligned aperatures 34 in the side plates 4 and 6 and through the tube 12. The bolt is provided with a head 36 for a purpose as will be hereinafter set forth. The bolt shank 32 is provided with a reduced portion 38 providing horizontally spaced shoulders or flanges 40 and 42 for a purpose as will be hereinafter set forth. The outer end of the shank 32 is provided with a plurality of threads 44 preferably of the "Acme" type cooperating with a nut 46 maintained on the side plate 6 by welding or the like, and in alignment with the aperature 34 in order to receive the bolt 32 in locking position. A circular split lock washer 48 encircles the reduced shank portion 38 as clearly shown in Figures 2 and 4. The lock washer 48 is of a spring resilient type and is maintained on the shank 38 by the spaced shoulders 40 and 42.

In assembly the parts are positioned as shown in Figure 2 with the bolt 32 maintaining the side plates 6 through cooperation with the nut 46. The bolt head 36 is provided with a recess 50 in which is disposed a spring and pawl member 52 adapted to cooperate with a groove 54 in the plate 4 when in assembled position. As clearly shown in Figures 2 and 4 the threads 44 are of the coarse type, and the spring urged detent 52 cooperating the recess 54 will assist in maintaining the threaded cooperation between the bolt shank 32 and the nut 46.

When it is desired to string or thread a cable (not shown) onto the sheave 8, the bolt 32 and its head 36 are rotated in a retrograde path to unthread the shank 32 from the stationary nut 46 on the plate 6. As soon as the bolt 32 moves away from the nut, the plate 6 may be swung or positioned as shown in Figures 3 and 4 in order to permit the threading of the sheave 8. The use of snatch blocks is usually in heavy field operations under all kinds of conditions. In the threading operation by the release of a plate connecting bolt 32, there is a tendency to misplace the bolt or it will slip out by vibration and become lost. The spring member 48 maintains a resilient frictional engagement between the bolt shank 42 and the inner periphery of the tube 12 which will permit retrograde movement of the bolt 32 away from the nut 46. However, the frictional locking member 48 will maintain the bolt in the tube 12 and thus prevent it from completely slipping out of the tube. It will be apparent that if a sufficient pull or force is exerted on the bolt, it may be removed from the tube 12, but the circular spring 48 exerts sufficient pressure to prevent its slipping out or easily removed from the tube member 12. In this manner it will be seen that the threading operation can be done without danger of misplacing or losing the bolt member securing the side plates 4 and 6.

In Figures 6 and 7 is shown a modification of the locking structure wherein the bolt 60 is provided with a head 62 in a manner similar to the preferred embodiment. The tube 64 is provided with end flanges 66 extending outwardly from both sides, and are secured to the side plates 4 and 6 in the usual manner. The tube carries the usual becket 18 having the cooperating shank and hook member 24. A nut 46 is welded to the plate 6 in alignment with the aligned apertures 68 of the side plates 4 and 6. The modified bolt shank 60 is provided with a transverse recess 70 in which is disposed a spring urged detent member, comprising a circular ball 72 and spring 73. The end flanges 66 of the tube 12 provides shoulders 74 and 76. In assembly the bolt 60 is secured through by the threads 44 to the nut 46 in substantially the same manner as in the preferred embodiment. The spring urged detent 72 is in frictional engagement with the inner periphery 77 of the tube 64 and between the shoulders 74 and 76. When it is desired to string a cable (not shown) on the sheave 8, the bolt 60 is rotated in a retrograde direction to permit swinging movement of the plate 6. However, the frictional contact of the spring urged detent 72 against the inner periphery 77 of the tube 64 prevents easy removal of the bolt from the tube 64. Furthermore with a bolt moved to a position as shown in Figure 7, the detent 72 will contact the shoulders 74 and prevents easy removal of the bolt. It will be apparent that with sufficient force the tension of the spring 73 in the detent may be overcome to pull the bolt from the tube 64. However, the contact of the ball detent 72 is sufficient to maintain it in the block during a threading operation.

From the foregoing it will be apparent that the present invention contemplates a snatch block wherein one of the side plates may be swung about is supporting axis to permit threading of a cable on to the sheave. Furthermore, the connecting member for the side plates is provided with a retaining means to prevent its slipping out in a released or unlocked position due to vibration or other causes. The maintaining of the released connecting bolt for the side plates of the block during a threading operation prevents it from becoming lost or misplaced and thereby facilitates the threading operation and use of the snatch block.

Changes may be made in the specification and drawings without departing from the spirit of the invention within the scope of the following claims, as set forth.

What I claim is:

1. In a snatch block having opposite side plates, a rotatable pulley journaled between the plates, a tubular member disposed between the plates, a nut secured to one of the plates, a bolt extending through the tubular member and having threaded engagement with the nut, said bolt movable from the nut for releasing one of the plates to permit rotary displacement thereof, a reduced shank portion on the bolt providing spaced shoulders, a split resilient ring encircling the reduced portion, said ring providing frictional engagement between the bolt and the tubular member for maintaining the bolt thereon in released position.

2. In a snatch block having opposite side plates, a rotatable pulley journaled between the plates, a tubular member disposed between the plates, a nut secured to one of the plates, a bolt extending through the tubular member and having threaded engagement with the nut, said bolt movable from the nut for releasing one of the plates to permit rotary displacement thereof, a resilient ring encircling the bolt and providing frictional engagement with the tubular member for maintaining the bolt thereon in released position from the nut.

3. In a snatch block having opposite side plates, a rotatable pulley journaled between the plates, a tubular member disposed between the plates, a nut secured to one of the plates, a bolt extending through the tubular member and having threaded engagement with the nut, said bolt movable from the nut for releasing one of the plates to permit rotary displacement thereof, and spring means carried by the bolt providing frictional engagement with the inner periphery of the tubular member for maintaining the bolt therein upon a release from the nut.

4. In a snatch block having opposite side plates, a rotatable pulley journaled between the plates, a tubular member disposed between the plates, a nut secured to one of the plates, a bolt extending through the tubular member and having threaded engagement with the nut, said bolt movable from the nut for releasing one of the plates permitting rotary displacement thereof, a recess provided in the bolt, spring means disposed in the recess and providing frictional contact with the tubular member for maintaining the bolt in the tubular member during a released position of the bolt from the nut.

5. In a snatch block of the type having opposite side plates with a pulley journaled therebetween and with one side plate adapted to turn relative to the other plate about the axis of the pulley, a tubular member disposed between the side plates, a shank member extending through the tubular member and connecting with one of the side plates, said shank movable from a connection with the side plate for releasing the plate for turning movement, a spring urged detent carried by the shank member for maintaining the shank member in the tubular member during its released position from the side plate.

6. The structure embodied in claim 3 and including a spring detent member carried by the bolt head for assisting the threaded engagement of the bolt with the nut.

WILLIAM H. McKISSICK.

REFERENCES CITED

The following references are of record in the file of this patent:

UNITED STATES PATENTS

| Number | Name | Date |
|---|---|---|
| 2,366,636 | McKissick et al. | Jan. 2, 1945 |

FOREIGN PATENTS

| Number | Country | Date |
|---|---|---|
| 25,430 | Great Britain | Nov. 3, 1900 |